(12) United States Patent
Son et al.

(10) Patent No.: US 7,577,713 B2
(45) Date of Patent: Aug. 18, 2009

(54) SYSTEM AND METHOD FOR PROVIDING SERVICE OF BINDING INFORMATION APPLIANCES SUPPORTING SAME OR RESPECTIVE CONTROL MIDDLEWARES IN HOME NETWORK ENVIRONMENT

(75) Inventors: Young Sung Son, Daejeon (KR); Kyeong Deok Moon, Daejeon (KR); Kwang Roh Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 634 days.

(21) Appl. No.: 10/970,157

(22) Filed: Oct. 22, 2004

(65) Prior Publication Data

US 2005/0188050 A1    Aug. 25, 2005

(30) Foreign Application Priority Data

Dec. 17, 2003    (KR)    ............... 10-2003-0092514

(51) Int. Cl.
*G06F 15/16*    (2006.01)
(52) U.S. Cl. ............................ 709/208; 709/228
(58) Field of Classification Search ............... 709/208
See application file for complete search history.

(56) References Cited

U.S. PATENT DOCUMENTS 6,651,118 B2 *  11/2003  Carau et al. ............... 710/36
6,980,079 B1 *  12/2005  Shintani et al. ............ 340/3.1
2002/0163534 A1 *  11/2002  Choi et al. ................. 345/734
2003/0016682 A1 *  1/2003  Cho ........................... 370/401
2003/0169728 A1    9/2003  Choi
2004/0090924 A1 *  5/2004  Giaimo et al. ............. 370/252

FOREIGN PATENT DOCUMENTS

| KR | 2002-79203 | 10/2002 |
|---|---|---|
| KR | 2003-04540 | 1/2003 |
| KR | 1020030004540 | 1/2003 |
| KR | 1020030073433 | 9/2003 |

* cited by examiner

*Primary Examiner*—Patrice Winder
*Assistant Examiner*—Minh-Chau Nguyen
(74) *Attorney, Agent, or Firm*—Lowe Hauptman Ham & Berner, LLP

(57) ABSTRACT

The present invention relates to a system and method for providing a service of binding information appliances in a home network environment. A system for providing a service of binding two or more information appliances, supporting same or respective control middlewares, in a home network having a home server connected to information appliances is disclosed. The home server includes middlewares and connectors. The middlewares are connected to the information appliances to control the information appliances. The connectors apply standard services between the middlewares to connect the middlewares to each other.

8 Claims, 6 Drawing Sheets

SYSTEM AND METHOD FOR PROVIDING SERVICE OF BINDING INFORMATION APPLIANCES SUPPORTING SAME OR RESPECTIVE CONTROL MIDDLEWARES IN HOME NETWORK ENVIRONMENT

FIELD OF THE INVENTION

The present invention relates to a system and method for providing a service of binding information appliances in a home network environment; and more particularly, to a system and method for integrally supporting functions of heterogeneous middlewares by defining a standard scheme capable of exchanging control information, multimedia data, etc. between two or more information appliances supporting respective middlewares.

BACKGROUND OF THE INVENTION

Generally, there are many information appliances in a home network. The information appliances support same or respective middlewares.

Accordingly, it has been desired to effectively bind together information appliances existing in a home network and supporting respective middlewares.

SUMMARY OF THE INVENTION

It is, therefore, an object of the present invention to provide a system and method for providing a service of binding information appliances, in which a home server equipped with control middlewares in a home network connects functions and control operations of information appliances in a case where information appliances exist in the home network and a user desires to bind together two or more information appliances supporting respective control middlewares, thus providing compatibility between information appliances supporting same or respective control middlewares in a home network environment.

In accordance with one aspect of the present invention, there is provided a system for providing a service of binding two or more information appliances, supporting same or respective control middlewares, in a home network having a home server connected to information appliances, wherein the home server includes: middlewares connected to the information appliances to control the information appliances; and connectors applying standard services between the middlewares to connect the middlewares to each other.

Each of the middlewares includes: middleware-support interfaces to control respective information appliances supporting the middleware itself; and a middleware managing unit that activates middleware-support interfaces corresponding to respective information appliances when exchange of information and control operations between the information appliances are required.

And, the connectors carry out a binding of remote controls, function controls and data deliveries between the information appliances. In accordance with another aspect of the present invention, there is provided a method for providing a service of binding two or more information appliances, supporting same or respective control middlewares, in a home network having a home server connected to information appliances, including: providing a list of available information appliances among the information appliances to a user; determining whether information appliances selected by the user support same control middlewares when the number of the selected information appliances is two or more; carrying out an operation between the selected information appliances when it is determined that the selected information appliances support same control middlewares; and providing a service of binding the selected information appliances by activating interface modules of the selected information appliances and connectors.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Preferred embodiments of the present invention will now be described in detail with reference to the accompanying drawings.

Figure 1:
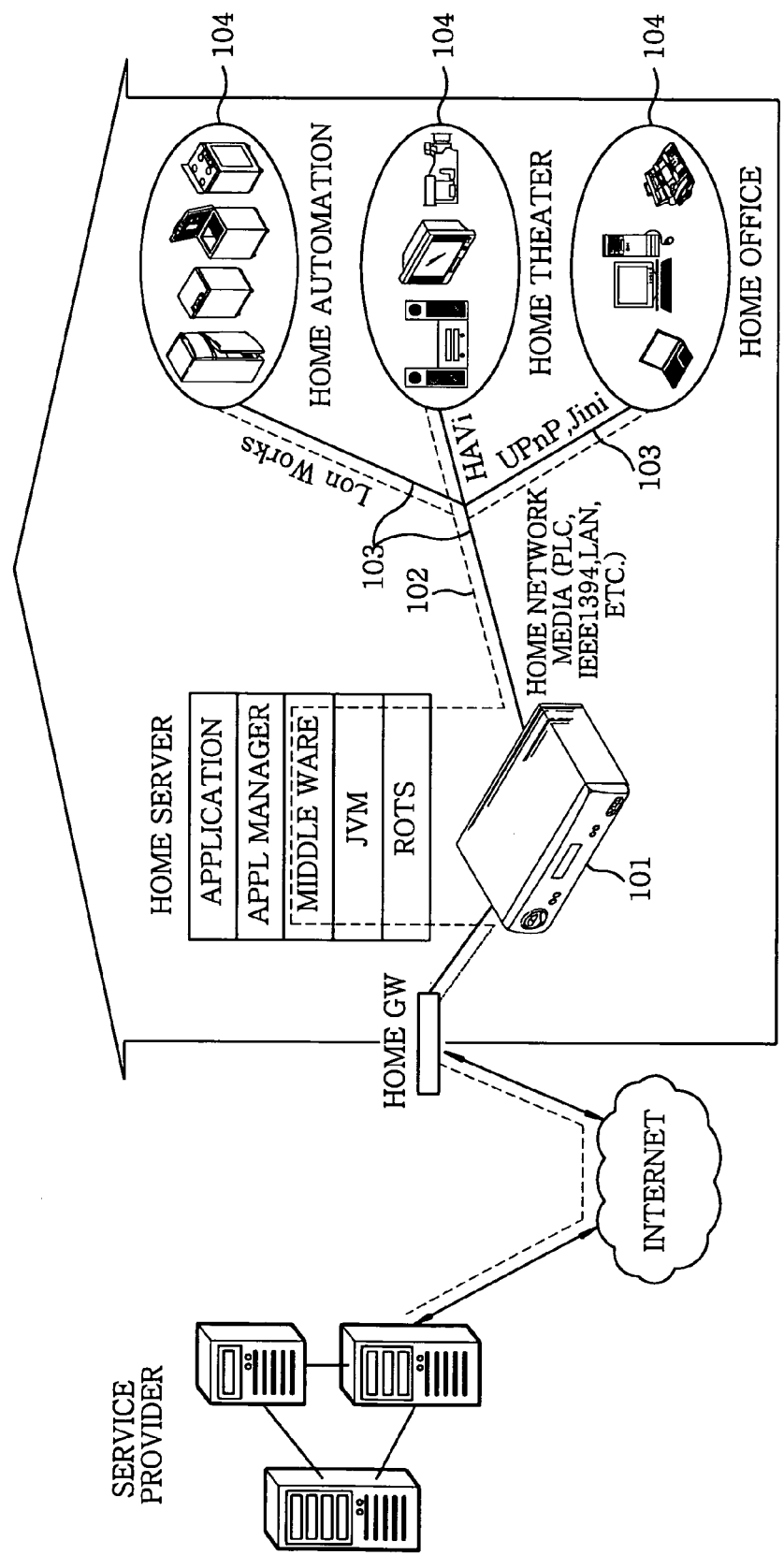
FIG. 1 represents an example of a physical environment of a home network in accordance with the present invention.

FIG. 1 represents an example of a physical environment of a home network in accordance with the present invention, which shows that various information appliances 104 supporting various middlewares, respectively, are connected to the home network around a home server 101.

In FIG. 1, various information appliances 104 connected to the home network are connected to the Internet existing outside a home through the home server 101. In the home, various types of home network media 102 exist, various control middlewares 103 with respective features, and various information appliances 104 supporting the control middlewares 103 exist. For the various information appliances 104 connected to the home network, there are various product groups such as household appliances. For example, there are a great number of devices in various fields ranging from simple products, such as a sensor or an electric bulb, to semi-intelligent devices, such as a refrigerator or a washing machine, and intelligent appliances, such as a television (TV), a Video Tape Recorder (VTR) or an audio player. In order to control such appliances using a Personal Computer (PC) or notebook connected to the Internet, or a portable terminal movably located in any location in the home, any type of network should be constructed therebetween. When home networks are classified according to the home network media 102, they can be classified into a Power Line Communication (PLC) network, a high speed communication network (Institute of Electrical and Electronics Engineers (IEEE) 1394), a data communication network (Local Area Network: LAN), and so forth. Especially, the data communication network is classified into a wired network and a wireless network. Further, when home networks are classified according to the control middlewares 103, they can be classified into a control communication network, such as LonWorks and Consumer Electronics Bus (CEBus), a Home Audio/Video Interoperability (HAVi) network supporting Audio and Video (AV), and a Jini or Universal Plug n Play (UPnP) network considered in terms of data communication. A service provider provides various services through the Internet.

Figure 2:
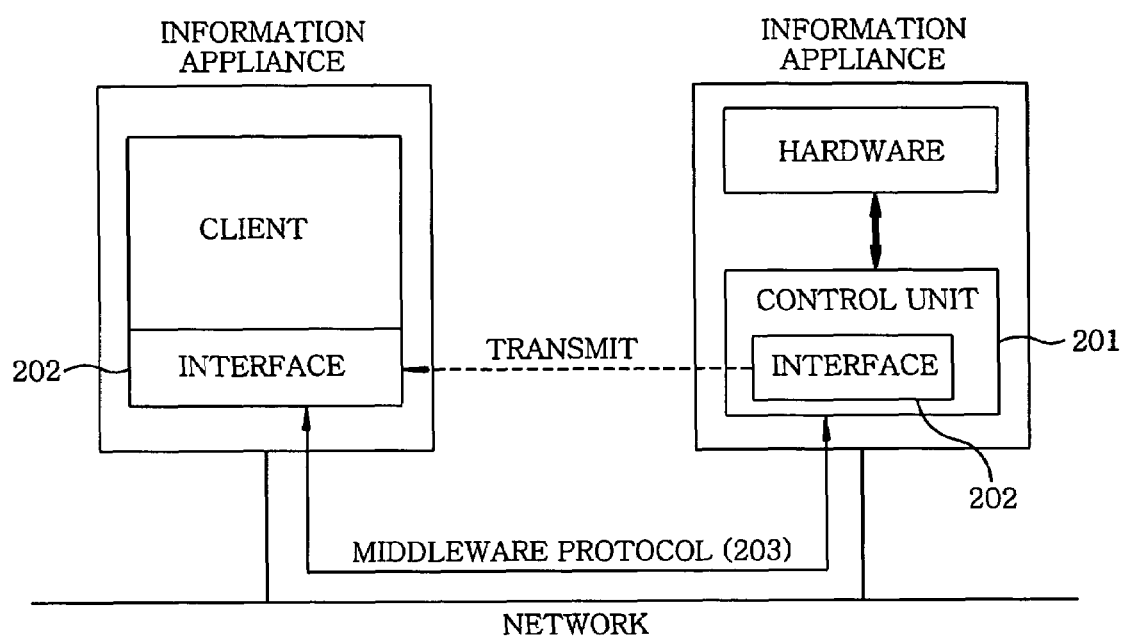
FIG. 2 provides a method for controlling information appliances using control middlewares in accordance with the present invention.

FIG. 2 provides a method for controlling information appliances using control middlewares in accordance with the present invention. Each of the information appliances includes a control unit 201 that performs control operations therein, and an interface 202, for example, a Proxy, Device Control Module (DCM) that allows the information appliance itself to be externally controlled. A communication protocol provided from a corresponding control middleware, that is, a middleware protocol 203, couples the control unit 201 and the interface 202.

In FIG. 2, if the information appliances are connected to the home network, they register their existences in corresponding middleware managing units, which will be described later. When another information appliance is required to control a corresponding information appliance, an interface of the corresponding information appliance is transmited to be activated, thus enabling a control operation to be performed under an actual activation environment.

Figure 3:
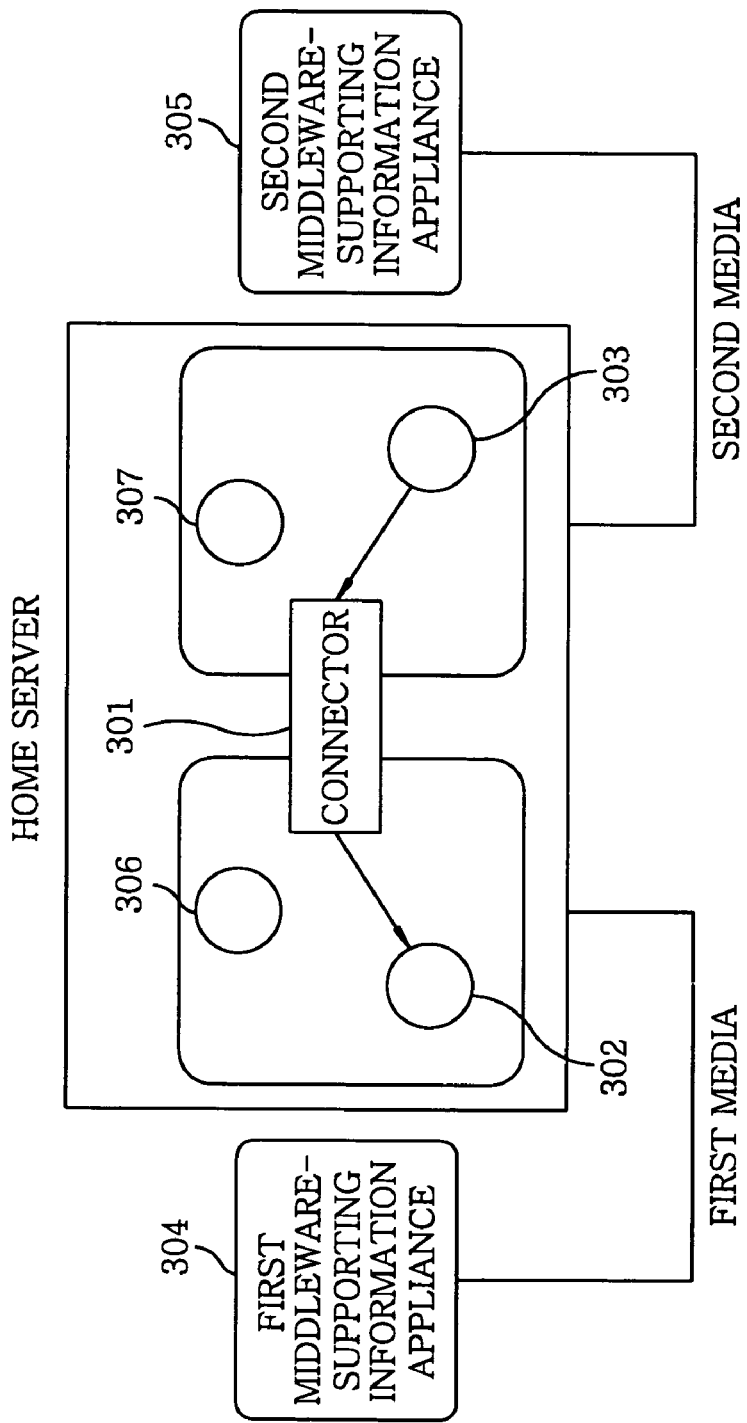
FIG. 3 describes a method of exchanging information and performing control operations between a first middleware-supporting information appliance and a second middleware-supporting information appliance, wherein the first and the second middleware are distinct from each other.

FIG. 3 describes a method for exchanging information and performing control operations between a first middleware-supporting information appliance 304 and a second middleware-supporting information appliance 305, wherein the first and the second middleware are distinct from each other. A system for performing the method includes a home server having first and second middlewares 306 and 307 connected to each other through a connector 301, and first and second middleware-supporting information appliances 304 and 305 connected to the first and second middlewares 306 and 307, respectively. The first and second middlewares 306 and 307 have first and second middleware-support interfaces 302 and 303, respectively, and have first and second middleware managing units 306a and 307a, respectively.

In FIG. 3, the first middleware-support interface 302, which is a program for controlling the first middleware-supporting information appliance 304, manages the control information and status information of the first middleware-supporting information appliance 304. The second middleware-support interface 303, which is a program for controlling the second middleware-supporting information appliance 305, manages the control information and status information of the second middleware-supporting information appliance 305. The connector 301 is operated between the first and second middleware-support interfaces 302 and 303, thus enabling the first and second middleware-supporting information appliances 304 and 305 to be actually bound together. For example, when a user desires to exchange information and perform control operations between the first and second middleware-supporting information appliances 304 and 305, the first and second middleware managing units 306a and 307a are operated in the home server, so that the first and second middleware-support interfaces 302 and 303 of the first and second middleware-supporting information appliances 304 and 305 are activated. Therefore, the control of the first and second middleware-supporting information appliances 304 and 305 can be enabled. Thereafter, for a connection between the first and second middleware-support interfaces 302 and 303, a suitable connector 301 is activated to carry out a operation, for example, that obtain the control information and appliance information of the second middleware-supporting information appliance 305 from the second middleware-support interface 303, and transmits the control and appliance information to the first middleware-support interface 302. Through such a series of operations, the first and second middleware-supporting information appliances 304 and 305 are bound together.

Figure 4:
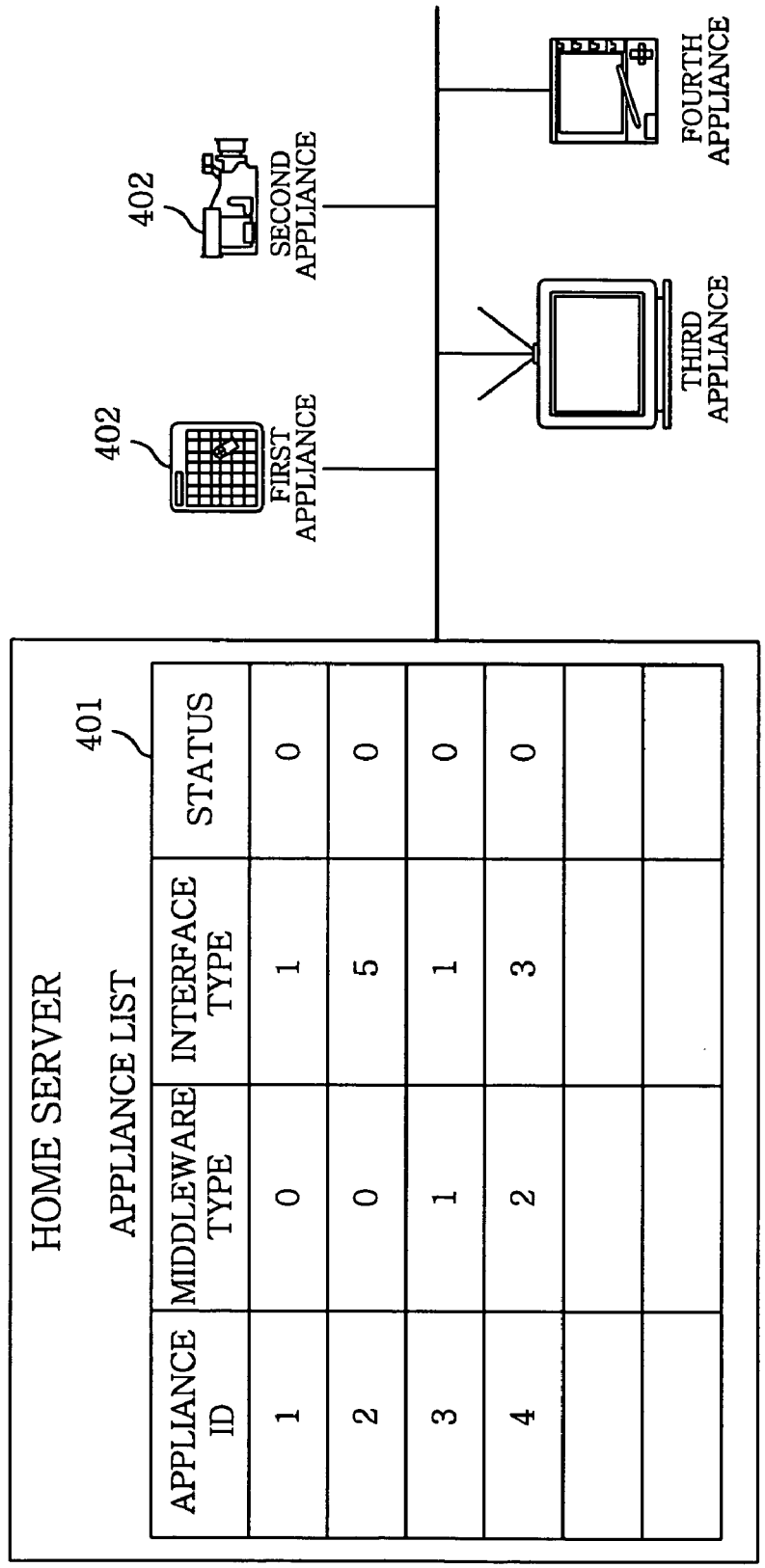
FIG. 4 illustrates that information appliances exist in a home network and a list about the information appliances is stored and managed in a home server in accordance with the present invention.

FIG. 4 illustrates that information appliances 402 exist in a home network and a list 401 about the information appliances is stored and managed in a home server in accordance with the present invention.

In FIG. 4, if the information appliances 402 are connected to the home network, they register their information in corresponding middleware managing units, for example first and second middleware managing units 306a and 307a, according to their several middleware protocols. The list 401 about the information appliances provided in the home server is managed in such a way that pieces of information about currently available information appliances are received from, for example, the first and second middleware managing units 306a and 307a, and the pieces of information are collected in a single list. The information appliance list 401 may include middleware types supported by the respective appliances and interface types of the respective appliances, and status information of the respective appliances. The home server provides a list of currently available appliances using the information appliance list 401 and activates the interface 202 of a corresponding appliance depending on user's selection when the user desires to use information appliances in the home network, thus enabling the corresponding appliance to be controlled and utilized.

Figure 5:
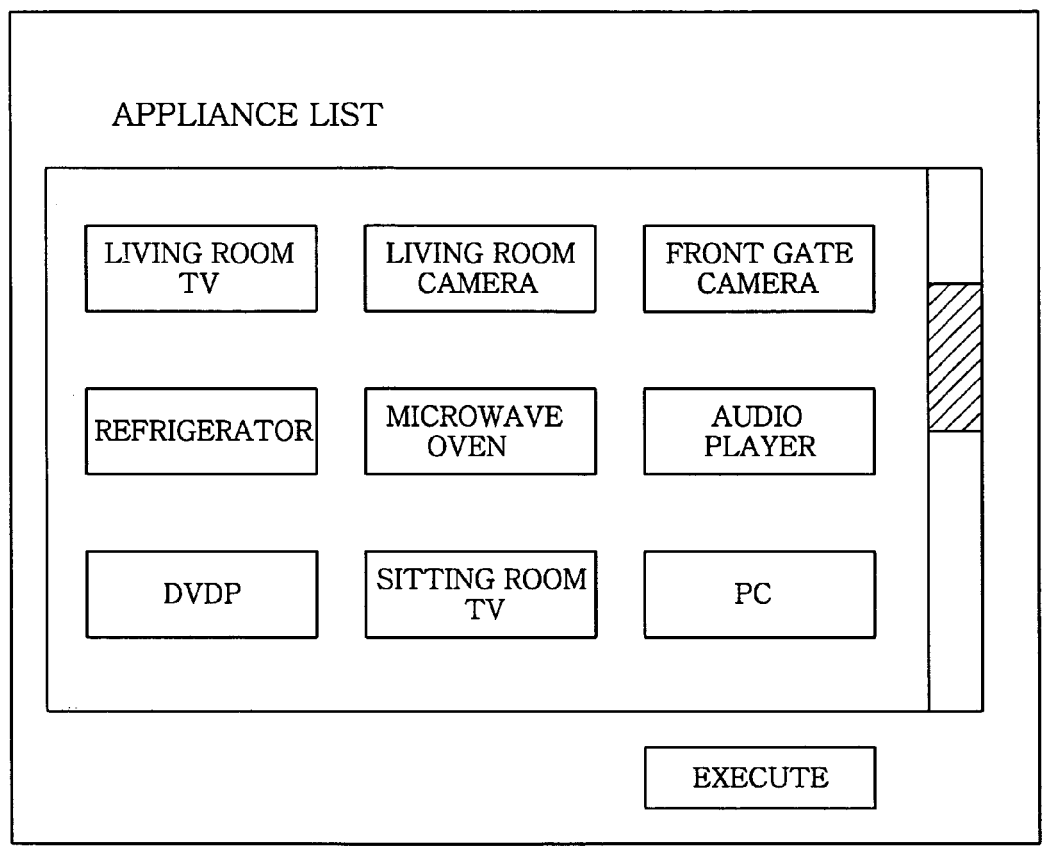
FIG. 5 offers an example of a Graphic User Interface (GUI) screen providing a list of information appliances.

FIG. 5 offers an example of a Graphic User Interface (GUI) screen provided to a user from the home server of the present invention, in which a list of currently available appliances is displayed on a screen display device of the home server or a portable terminal, such as a remote controller, in a form of icons. The user clicks at least one of the icons displayed on his or her portable terminal or screen display device to select and activate a corresponding information appliance.

Figure 6:
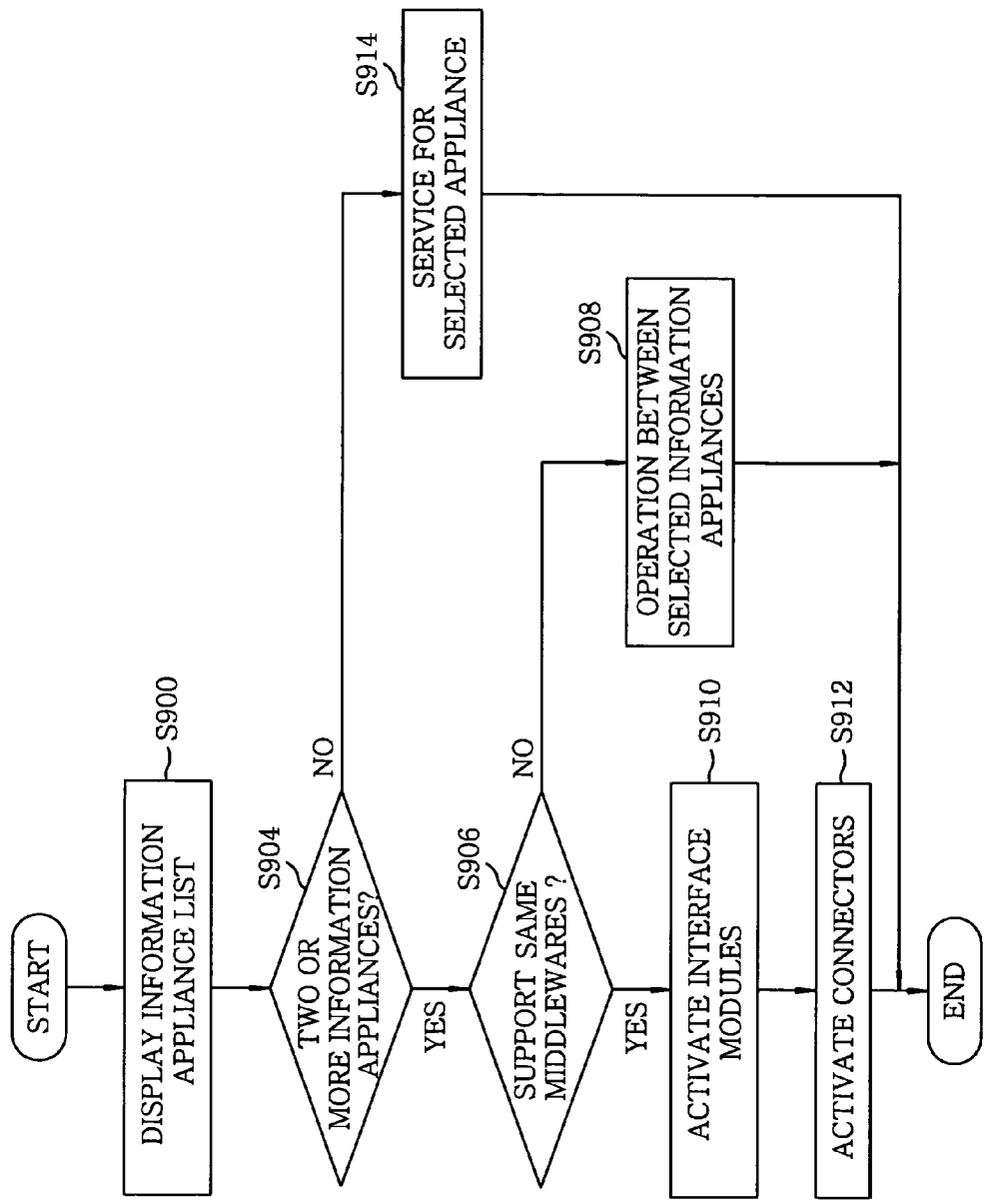
FIG. 6 shows a flowchart of an example bf a method for providing a service of binding information appliances in a home network environment in accordance with the present invention.

FIG. 6 shows a flowchart of an example of a method for providing a service of binding information appliances supporting same or respective control middlewares in a home network environment in accordance with an embodiment of the present invention.

Hereinafter, the binding operation using the connector 301 in the home server is described in steps with reference to FIGS. 5 and 6.

The home server displays a list of currently available information appliances on a portable terminal or a screen display device, in the format of FIG. 5 for example, through the use of the list 401 about the information appliances when a user desires to use corresponding information appliances in the home network at step S900.

When the user selects and activates one or more information appliances by clicking one or more icons displayed on the portable terminal or the screen display device, the home server determines whether the number of the information appliances selected by the user is two or more at step S904.

If it is determined that the number of the selected information appliances is two or more at step S904, the home server determines whether the information appliances selected by the user supports same control middlewares at step S906.

If it is determined that the information appliances selected by the user support same control middlewares at step S906, an operation between the selected information appliances is carried out in the control middleware at step S908.

If it is determined that the information appliances selected by the user support respective control middlewares at step S906, the home server activates interface modules for the selected information appliances at step S910, and activates connectors to bind several control middlewares respectively supported by the selected information appliances at step S912.

If the user selects a single information appliance at step S904, the home server offers a service for the selected information appliance by, for example, providing a GUI screen showing the status of the selected information appliance, and command buttons at step S914.

As described above, the present invention is advantageous in that it enables the exchange of information to be performed even between information appliances supporting respective control middlewares through a home server in a home network environment in which information appliances supporting various control middlewares exist, thus improving compatibility between the appliances of various information appliance manufacturers, and widening a range of user's choices. Further, the present invention is advantageous in that it enables service providers to offer services easily.

While the invention has been shown and described with respect to the preferred embodiments, it will be understood by those skilled in the art that various changes and modifications may be made without departing from the spirit and scope of the invention as defined in the following claims.

What is claimed is:

1. A system for providing a service of binding two or more information appliances, supporting same or respective control middlewares, in a home network having a home server connected to information appliances, the home server comprising:
    middlewares connected to the information appliances to control the information appliances, each middleware including a middleware-support interface and a middleware managing unit configured to activate the middleware-support interface; and
    connectors applying standard services between the middlewares to connect the middlewares to each other;
    wherein the connectors are operated between the middleware-support interfaces of the middlewares.

2. The binding service providing system according to claim 1, wherein the home server stores and manages a list of available information appliances among the information appliances.

3. The binding service providing system according to claim 2, wherein the list is designed to register therein appliance Identifications (IDs), appliance types and current status information of the available information appliances.

4. The binding service providing system according to claim 1, wherein each of the middlewares includes:
    middleware support interfaces to control respective information appliances supporting the middleware itself; and
    a middleware managing unit that activates middleware-support interfaces corresponding to respective information appliances when exchange of information and control operations between the information appliances are required.

5. The binding service providing system according to claim 1, wherein the connectors carry out a binding of remote controls, function controls and data deliveries between the information appliances.

6. The binding service providing system according to claim 1, wherein the information appliances are household appliances.

7. A method for providing a service of binding two or more information appliances, supporting same or respective control middlewares, each middleware including a middleware-support interface and a middleware managing unit for activating the middleware-support interface, in a home network having a home server connected to information appliances, comprising:
    providing a list of available information appliances among the information appliances to a user;
    determining whether information appliances selected by the user support same control middlewares when the number of the selected information appliances is two or more;
    carrying out an operation between the selected information appliances when it is determined that the selected information appliances support same control middlewares the operation being performed by a connector being operated between the middleware-support interfaces of the middlewares; and
    providing a service of binding the selected information appliances by activating interface modules of the selected information appliances and connectors;
    wherein the information appliances are directly connected to each other.

8. The binding service providing method according to claim 7, wherein the information appliances are household appliances.

* * * * *